US012803652B2

(12) United States Patent
Liu

(10) Patent No.: US 12,803,652 B2
(45) Date of Patent: Nov. 17, 2026

(54) INTELLIGENT SIGNAL AMPLIFIER OPERATION MODE CONFIGURATION METHOD AND APPARATUS, AND DEVICE

(71) Applicant: VIVO MOBILE COMMUNICATION CO., LTD., Guangdong (CN)

(72) Inventor: Jinhua Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 344 days.

(21) Appl. No.: 18/497,108

(22) Filed: Oct. 30, 2023

(65) Prior Publication Data

US 2024/0056167 A1 Feb. 15, 2024

Related U.S. Application Data

(63) Continuation of application No. PCT/CN2022/088947, filed on Apr. 25, 2022.

(30) Foreign Application Priority Data

Apr. 28, 2021 (CN) ......................... 202110470515.8

(51) Int. Cl.
*H04B 7/155* (2006.01)

(52) U.S. Cl.
CPC ..... *H04B 7/15592* (2013.01); *H04B 7/15535* (2013.01)

(58) Field of Classification Search
CPC . H04B 7/14; H04B 7/15; H04B 7/155; H04B 7/15592; H04B 7/15528; H04B 7/15535; H04B 7/15542; H04B 7/15557
See application file for complete search history.

(56) References Cited

U.S. PATENT DOCUMENTS 6,690,657 B1 * 2/2004 Lau ...................... H04B 7/2606 370/315
8,630,650 B2 * 1/2014 Lee .................. H04W 36/0061 455/446

(Continued)

FOREIGN PATENT DOCUMENTS

CN 101123789 A 2/2008
CN 101841865 A 9/2010

(Continued)

OTHER PUBLICATIONS

Extended European Search Report for Application No. 22794842.9, dated Aug. 13, 2024, 11 Pages.

(Continued)

*Primary Examiner* — James M Perez
(74) *Attorney, Agent, or Firm* — BROOKS KUSHMAN P.C.

(57) ABSTRACT

An intelligent signal amplifier operation mode configuration method and apparatus, and a device. The method includes: receiving, by an intelligent signal amplifier, operation mode configuration information from a network-side device; and setting, by the intelligent signal amplifier based on the operation mode configuration information, a target operation mode, where the operation mode configuration information is used for configuring N operation modes for the intelligent signal amplifier; the N operation modes include at least one of the following: frequency-domain operation mode or time-domain operation mode; and the target operation mode is at least one of the N operation modes.

20 Claims, 5 Drawing Sheets

(56) References Cited

U.S. PATENT DOCUMENTS

| | | | | |
|---|---|---|---|---|
| 8,983,556 | B2 * | 3/2015 | Takano | H04B 7/15557 455/574 |
| 9,036,533 | B2 * | 5/2015 | Liu | H04W 72/04 455/7 |
| 9,191,096 | B2 * | 11/2015 | Takano | H04B 7/15557 |
| 9,832,701 | B2 * | 11/2017 | Usui | H04W 16/32 |
| 10,236,921 | B1 * | 3/2019 | Kohlhepp | H04B 7/15 |
| 11,729,857 | B2 * | 8/2023 | Islam | H04W 72/23 370/311 |
| 12,089,190 | B2 * | 9/2024 | Liu | H04L 5/0048 |
| 12,133,224 | B2 * | 10/2024 | Hofström | H04W 28/0278 |
| 12,185,070 | B2 * | 12/2024 | Xu | H04M 1/6016 |
| 12,224,837 | B2 * | 2/2025 | Braun | H04B 7/0413 |
| 12,382,541 | B2 * | 8/2025 | Islam | H04W 52/0216 |
| 12,531,600 | B2 * | 1/2026 | Jiang | H04B 7/04013 |
| 2011/0228719 | A1 * | 9/2011 | Liu | H04B 7/15557 370/315 |
| 2012/0052796 | A1 * | 3/2012 | Takano | H04W 52/0206 455/7 |
| 2013/0176875 | A1 * | 7/2013 | Huang | H04B 7/15557 370/252 |
| 2015/0124688 | A1 * | 5/2015 | Xu | H04B 7/0452 370/312 |
| 2016/0044741 | A1 * | 2/2016 | Takano | H04B 7/155 370/311 |
| 2020/0052775 | A1 * | 2/2020 | Nam | H04B 7/15592 |
| 2020/0100088 | A1 * | 3/2020 | Kim | H04W 48/16 |
| 2020/0112919 | A1 * | 4/2020 | Nam | H04W 52/0229 |
| 2021/0021974 | A1 * | 1/2021 | Kim | H04W 4/12 |
| 2021/0037459 | A1 * | 2/2021 | Li | H04B 17/327 |
| 2021/0037574 | A1 * | 2/2021 | Li | H04W 16/28 |
| 2021/0235430 | A1 * | 7/2021 | Liu | H04L 5/0048 |
| 2021/0242916 | A1 * | 8/2021 | Lomayev | H04B 1/04 |
| 2021/0259044 | A1 * | 8/2021 | Islam | H04W 72/535 |
| 2021/0409106 | A1 * | 12/2021 | Ashworth | H04B 7/15535 |
| 2022/0053433 | A1 * | 2/2022 | Abedini | H04B 7/06952 |
| 2022/0053486 | A1 * | 2/2022 | Abedini | H04B 7/0696 |
| 2022/0070907 | A1 * | 3/2022 | Hofström | H04W 72/21 |
| 2022/0103247 | A1 * | 3/2022 | Abedini | H04B 7/2041 |
| 2022/0201767 | A1 * | 6/2022 | Wei | H04B 7/15 |
| 2022/0311487 | A1 * | 9/2022 | Abedini | H04B 7/0617 |
| 2022/0345193 | A1 * | 10/2022 | Braun | H04B 7/15557 |
| 2022/0408190 | A1 * | 12/2022 | Xu | H04M 1/6016 |
| 2023/0016721 | A1 * | 1/2023 | Abedini | H04B 7/0408 |
| 2023/0032511 | A1 * | 2/2023 | Horn | H04B 7/04013 |
| 2023/0261733 | A1 * | 8/2023 | Tekgul | H04B 7/15557 370/315 |
| 2023/0283348 | A1 * | 9/2023 | MolavianJazi | H04B 7/0639 |
| 2023/0389125 | A1 * | 11/2023 | Islam | H04W 72/535 |
| 2024/0056167 | A1 * | 2/2024 | Liu | H04W 52/0245 |
| 2024/0056992 | A1 * | 2/2024 | Liu | H04B 7/15535 |
| 2024/0073964 | A1 * | 2/2024 | Liu | H04B 7/04013 |
| 2024/0080067 | A1 * | 3/2024 | Jiang | H04B 7/04013 |
| 2024/0179769 | A1 * | 5/2024 | Zhong | H04W 64/00 |
| 2024/0187085 | A1 * | 6/2024 | Mcmenamy | H04B 7/15557 |
| 2024/0187091 | A1 * | 6/2024 | Abedini | H04B 7/2041 |
| 2024/0357668 | A1 * | 10/2024 | Wu | H04W 74/0833 |
| 2024/0406751 | A1 * | 12/2024 | Akl | H04B 7/15528 |
| 2024/0406935 | A1 * | 12/2024 | Liu | H04L 5/0048 |
| 2025/0023696 | A1 * | 1/2025 | Wang | H04L 5/0094 |
| 2025/0071657 | A1 * | 2/2025 | Liu | H04W 76/14 |
| 2025/0150995 | A1 * | 5/2025 | Qu | H04L 5/00 |
| 2026/0149497 | A1 * | 5/2026 | Khan | H04B 7/15542 |

FOREIGN PATENT DOCUMENTS

| | | | |
|---|---|---|---|
| CN | 102196450 | A | 9/2011 |
| CN | 106559818 | A | 4/2017 |
| CN | 110365347 | A | 10/2019 |
| JP | 2011029851 | A | 2/2011 |
| JP | 2016528771 | A | 9/2016 |
| WO | 2020060890 | A9 | 3/2020 |
| WO | 2021046140 | A1 | 3/2021 |

OTHER PUBLICATIONS

First Office Action for Japanese Application No. 2023-566705, dated Nov. 21, 2024, 4 Pages.

First Office Action for Chinese Application No. 202110470515.8, dated Dec. 1, 2023, 13 Pages.

International Search Report and Written Opinion for Application No. PCT /CN2022/088947, dated Jul. 26, 2022, 6 Pages.

* cited by examiner

INTELLIGENT SIGNAL AMPLIFIER OPERATION MODE CONFIGURATION METHOD AND APPARATUS, AND DEVICE

CROSS-REFERENCE TO RELATED APPLICATIONS

This application is a continuation of International Application No. PCT/CN2022/088947 filed on Apr. 25, 2022, which claims priority to Chinese Patent Application No. 202110470515.8 filed on Apr. 28, 2021, which are incorporated herein by reference in their entireties.

TECHNICAL FIELD

This application pertains to the field of communications technologies, and specifically relates to an intelligent signal amplifier operation mode configuration method and apparatus, and a device.

BACKGROUND

An intelligent signal amplifier is used to extend the coverage area of a cell and has functions mainly including: receiving and amplifying downlink signals from a base station to enhance the strength of the signals reaching a UE, and amplifying uplink signals from a UE to enhance the strength of the signals from the UE to a base station. The intelligent signal amplifier can be controlled by a base station. That is, the base station can control transmission parameters of the amplifier, for example, power-on/-off, transmitted beams, and the like of the intelligent signal amplifier, so as to increase the signal power of the amplifier and reduce interference. In a network structure shown in FIG. 1, three network nodes are included, and the intermediate network node is an intelligent signal amplifier, which includes a mobile termination (MT) and a radio frequency module. The MT is used to establish a connection with a base station, and the base station interacts with the intelligent signal amplifier through the MT so that transmission parameters of the intelligent signal amplifier can be configured.

However, existing intelligent signal amplifiers rely on configuration at the base station. After being powered on, the intelligent signal amplifier continuously operates, typically only amplifying or forwarding full-carrier uplink and downlink signals, and the operation mode cannot be adjusted. In this case, signals are still forwarded in a full-carrier and full-time manner in the event of low network load, causing greater power consumption and higher electricity loss of the network.

SUMMARY

According to a first aspect, an intelligent signal amplifier operation mode configuration method is provided. The method includes: receiving, by the intelligent signal amplifier, operation mode configuration information from a network-side device; and setting, by the intelligent signal amplifier based on the operation mode configuration information, a target operation mode, where the operation mode configuration information is used for configuring N operation modes for the intelligent signal amplifier; the N operation modes include at least one of the following: frequency-domain operation mode or time-domain operation mode; and the target operation mode is at least one of the N operation modes.

According to a second aspect, an intelligent signal amplifier operation mode configuration apparatus is provided. The apparatus includes a receiving module and a setting module. The receiving module is configured to receive operation mode configuration information from a network-side device, and the setting module is configured to set a target operation mode for the intelligent signal amplifier based on the operation mode configuration information received by the receiving module, where the operation mode configuration information is used for configuring N operation modes for the intelligent signal amplifier; the N operation modes include at least one of the following: frequency-domain operation mode or time-domain operation mode; and the target operation mode is at least one of the N operation modes.

According to a third aspect, an intelligent signal amplifier operation mode configuration method is provided. The method includes: sending, by a network-side device, operation mode configuration information to an intelligent signal amplifier; where the operation mode configuration information is used for configuring N operation modes for the intelligent signal amplifier; the N operation modes include at least one of the following: frequency-domain operation mode or time-domain operation mode; and a target operation mode is at least one of the N operation modes.

According to a fourth aspect, an intelligent signal amplifier operation mode configuration apparatus is provided. The apparatus includes a sending module. The sending module is configured to send operation mode configuration information to the intelligent signal amplifier; where the operation mode configuration information is used for configuring N operation modes for the intelligent signal amplifier; the N operation modes include at least one of the following: frequency-domain operation mode or time-domain operation mode; and a target operation mode is at least one of the N operation modes.

According to a fifth aspect, an intelligent signal amplifier is provided. The intelligent signal amplifier includes a processor, a memory, and a program or instructions stored in the memory and capable of running on the processor. When the program or instructions are executed by the processor, the steps of the method according to the first aspect are implemented.

According to a sixth aspect, an intelligent signal amplifier is provided, including a processor and a communication interface. The processor is used to: receive operation mode configuration information from a network-side device; and set a target operation mode based on the operation mode configuration information, where the operation mode configuration information is used for configuring N operation modes for the intelligent signal amplifier; the N operation modes include at least one of the following: frequency-domain operation mode or time-domain operation mode; and the target operation mode is at least one of the N operation modes.

According to a seventh aspect, a network-side device is provided. The network-side device includes a processor, a memory, and a program or instructions stored in the memory and capable of running on the processor. When the program or instructions are executed by the processor, the steps of the method according to the third aspect are implemented.

According to an eighth aspect, a network-side device is provided, including a processor and a communication interface. The processor is used to send operation mode configuration information to an intelligent signal amplifier; where the operation mode configuration information is used for configuring N operation modes for the intelligent signal amplifier; the N operation modes include at least one of the following: frequency-domain operation mode or time-domain operation mode; and a target operation mode is at least one of the N operation modes.

According to a ninth aspect, a readable storage medium is provided. The readable storage medium stores a program or instructions. When the program or instructions are executed by a processor, the steps of the method according to the first aspect or the steps of the method according to the third aspect are implemented.

According to a tenth aspect, a chip is provided. The chip includes a processor and a communication interface, where the communication interface is coupled to the processor, and the processor is configured to run a program or instructions to implement the method according to the first aspect or the method according to the third aspect.

According to an eleventh aspect, a computer program/program product is provided. The computer program/program product is stored in a non-volatile storage medium, and the program/program product is executed by at least one processor to implement the steps of the method according to the first aspect or the method according to the third aspect.

DETAILED DESCRIPTION

The following clearly describes the technical solutions in the embodiments of this application with reference to the accompanying drawings in the embodiments of this application. It is clear that the described embodiments are only some but not all of the embodiments of this application. All other embodiments obtained by persons of ordinary skill in the art based on the embodiments of this application shall fall within the protection scope of this application.

The terms “first”, “second”, and the like in this specification and claims of this application are used to distinguish between similar objects rather than to describe a specific order or sequence. It should be understood that the terms used in this way is interchangeable in appropriate circumstances so that the embodiments of this application can be implemented in other orders than the order illustrated or described herein, and “first” and “second” are usually for distinguishing same-type objects but not limiting the number of objects, for example, a first object may be one or multiple. In addition, “and/or” in this specification and claims indicates at least one of connected objects, and the symbol “I” generally indicates that the associated objects are in an “or” relationship.

It should be noted that the technologies described in the embodiments of this application are not limited to long term evolution (LTE)/LTE-Advanced (LTE-A) systems, and may also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms “system” and “network” in the embodiments of this application are usually used interchangeably. Techniques described herein may be used in the afore-mentioned systems and radio technologies, and may also be used in other systems and radio technologies. In the following descriptions, a new radio (NR) system is described for an illustration purpose, and the NR term is used in most of the following descriptions, but these technologies may also be applied to other applications than an NR system application, for example, the 6th generation (6G) communications system.

Figure 1:
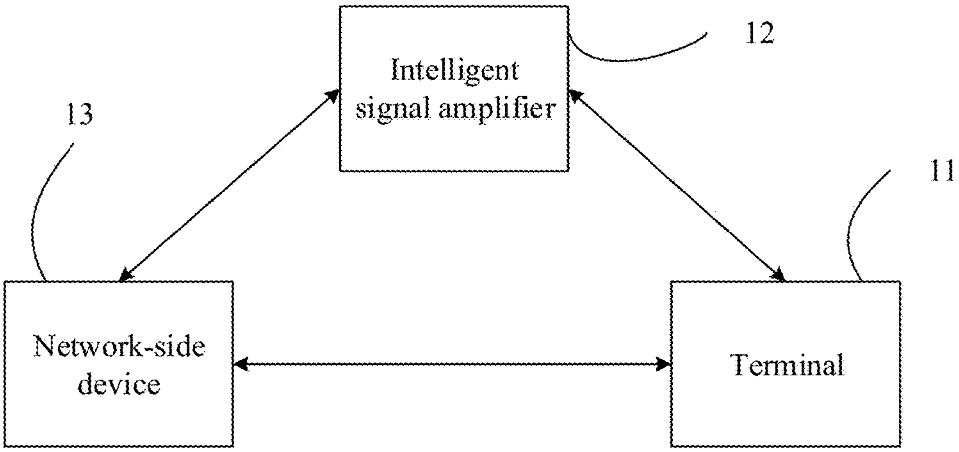
FIG. 1 is a block diagram of a communications system according to an embodiment of this application.

FIG. 1 is a block diagram of a wireless communications system to which embodiments of this application are applicable. The wireless communications system includes a terminal 11, an intelligent signal amplifier 12, and a network-side device 13.

The intelligent signal amplifier is used to extend the coverage area of a cell and has functions mainly including: receiving and amplifying downlink signals from a network-side device to enhance the strength of the signals reaching a terminal, and amplifying uplink signals from the terminal to enhance the strength of the signals from the terminal to the network-side device. The intelligent signal amplifier can be controlled by the network-side device. That is, the network-side device can control transmission parameters of the intelligent signal amplifier, for example, power-on/-off, transmitted beams, and the like of the intelligent signal amplifier, so as to increase the signal power of the intelligent signal amplifier and reduce interference.

For example, signals/channels that need to be amplified by the intelligent signal amplifier may include:

- cell discovery signals: primary synchronization signals (PSS), secondary synchronization signals (SSS), and master information blocks (MIB);
- physical downlink control channels (PDCCH) and physical downlink shared channels (PDSCH) used for sending information to users;
- PDCCHs and PDSCHs used for system information broadcasting;
- physical random access channels (PRACH); and physical uplink control channels (PDCCH) and physical uplink shared channels (PDSCH) used to send uplink user information.

For example, the intelligent signal amplifier includes a terminal module (MT) and a radio frequency module (RU) (also referred to as a radio frequency unit). The MT is used to establish a connection with the network-side device, and the network-side device interacts with the intelligent signal amplifier through the MT so that transmission parameters of the intelligent signal amplifier can be configured. Typically, after being powered on, the intelligent signal amplifier continuously operates, amplifying or forwarding full-carrier uplink and downlink signals without considering whether a carrier carries a signal that needs to be forwarded. In this case, signals are still forwarded in a full-carrier and full-time manner in the event of low network load, causing greater power consumption and higher electricity loss of the network.

For example, the terminal 11 may also be referred to as a terminal device or user equipment (UE), and the terminal 11 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a smart watch, a wrist band, earphones, glasses, or the like.

It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

The following describes in detail the intelligent signal amplifier operation mode configuration method and apparatus provided in the embodiments of this application by using some embodiments and application scenarios thereof with reference to the accompanying drawings.

Figure 2:
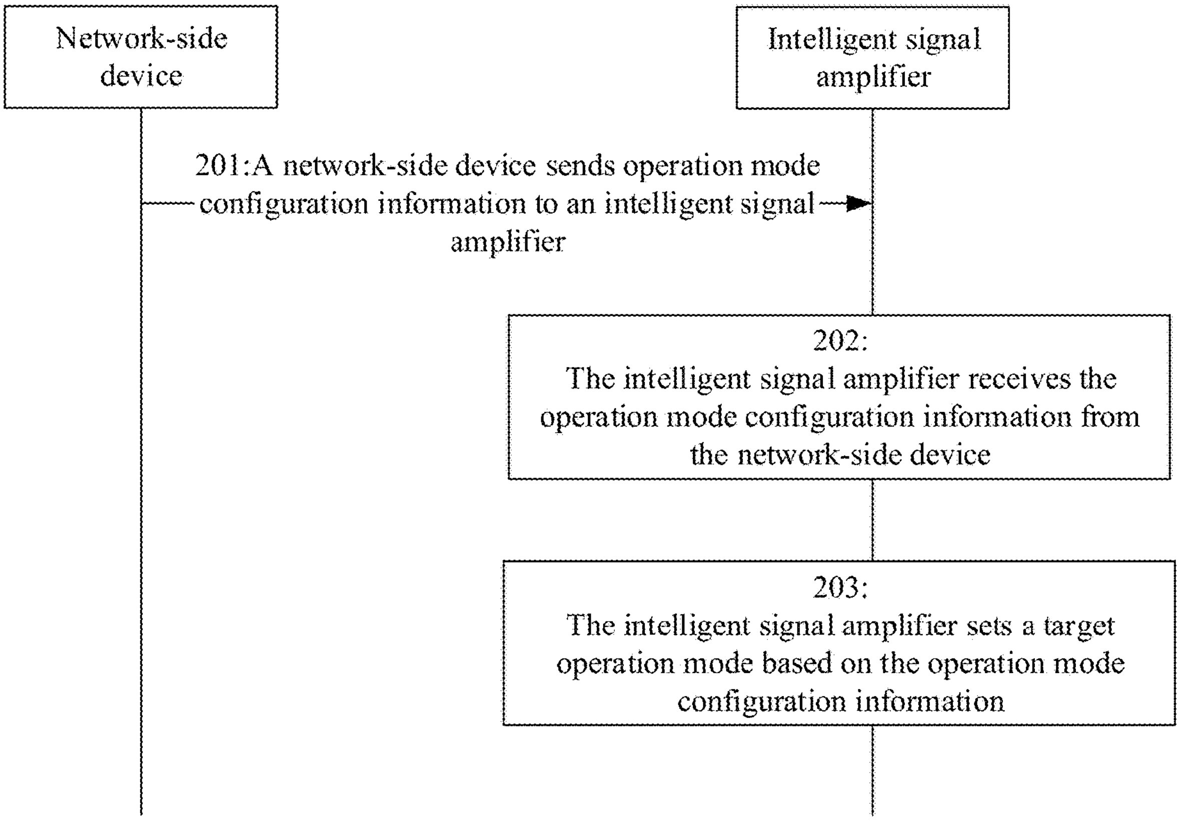
FIG. 2 is a first flowchart of an intelligent signal amplifier operation mode configuration method according to an embodiment of this application.

FIG. 2 is a flowchart of an intelligent signal amplifier operation mode configuration method according to an embodiment of the present invention. As shown in FIG. 2, the operation mode configuration method according to this embodiment of this application may include step 201 to step 203.

Step 201. A network-side device sends operation mode configuration information to an intelligent signal amplifier.

Step 202. The intelligent signal amplifier receives the operation mode configuration information from the network-side device.

Step 203. The intelligent signal amplifier sets a target operation mode based on the operation mode configuration information.

In this embodiment of this application, the operation mode configuration information is used for configuring N operation modes for the intelligent signal amplifier. The N operation modes include at least one of the following: frequency-domain operation mode or time-domain operation mode; and the target operation mode is at least one of the N operation modes.

In this embodiment of this application, one frequency-domain operation mode corresponds to one set of frequency-domain operating subband configuration parameters; and one time-domain operation mode corresponds to one set of operation window configuration parameters.

In this embodiment of this application, the operation mode configuration information is at least used to configure an operation mode of a radio frequency unit for signal forwarding in the intelligent signal amplifier.

Figure 3:
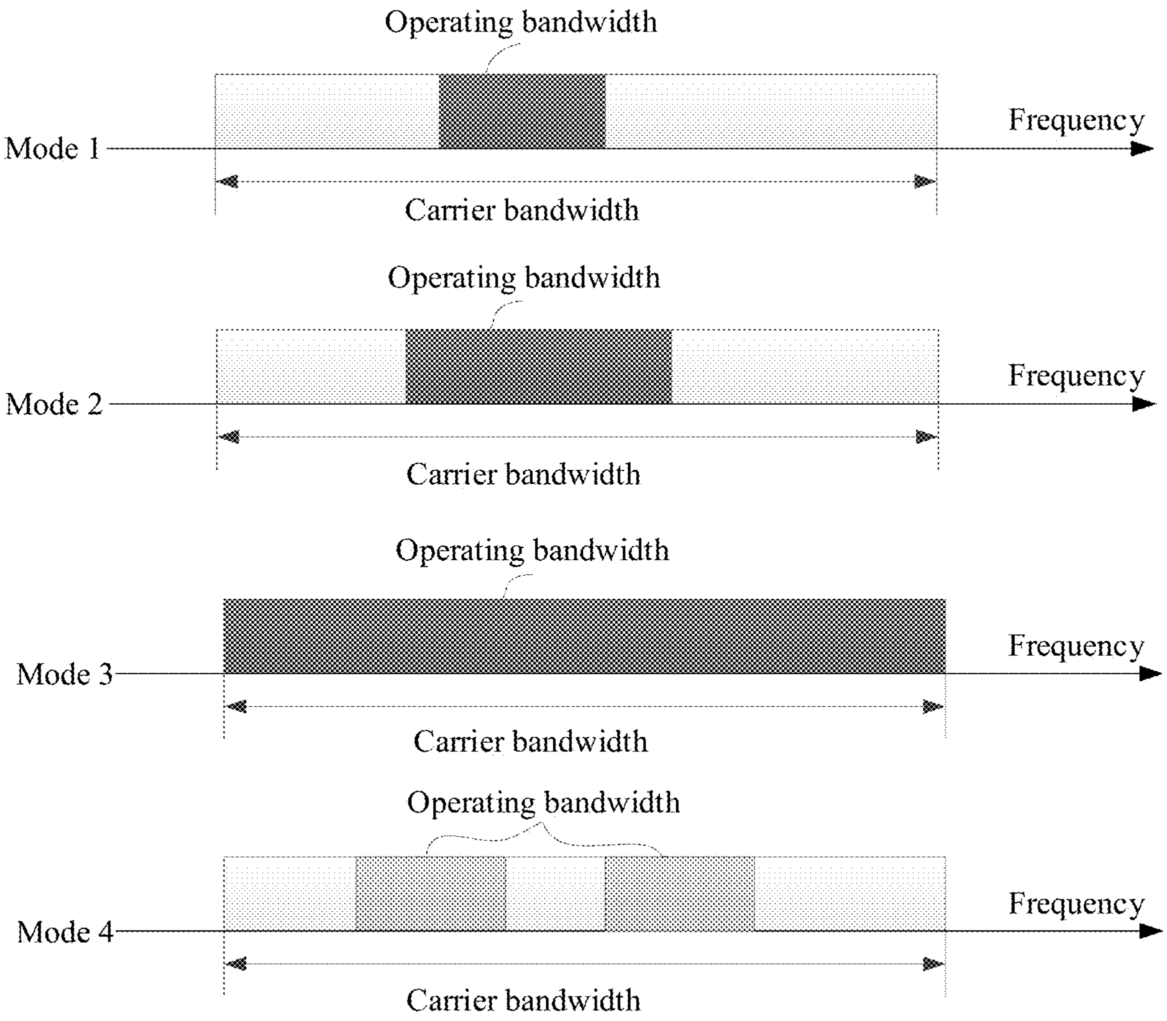
FIG. 3 is a first operation mode schematic diagram of an intelligent signal amplifier operation mode configuration method according to an embodiment of this application.

For example, regarding the frequency-domain operation mode in this embodiment of this application, one or more operation modes (for example, schematic diagrams of operation modes corresponding to Mode 1, Mode 2, Mode 3, and Mode 4 shown in FIG. 3) for different operation bandwidths may be configured by the network-side device for the intelligent signal amplifier. Generally, an operation mode for a narrow operation bandwidth is activated in the case of low system load, and an operation mode for a broad operation bandwidth is activated in the case of high system load. In FIG. 3, Mode 1 is used in the case of lowest load, Mode 2 is used in the case of medium load, and Mode 3 is used in the case of high load.

In FIG. 3, Mode 1, Mode 2, and Mode 3 show three different operating subbands (namely, operation bandwidths (Operation bandwidth)) configured by the network-side device for the intelligent signal amplifier based on system load in a case that the intelligent signal amplifier operates at corresponding carrier bandwidths (Carrier bandwidth). This can satisfy the needs of signal forwarding while reducing power consumption. Similarly, it can be known from Mode 4 in FIG. 3, two different operating subbands are configured for Mode 4, and Mode 4 may be used in a case that bandwidth parts (Bandwidth Part, BWP) of different UEs being served are configured to be within different frequency ranges.

Optionally, in an embodiment of this application, each operation mode corresponds to a forwarding power configuration parameter.

Optionally, in an embodiment of this application, the time-domain operation mode and the frequency-domain operation mode are allowed to be configured simultaneously and to be in an active state simultaneously.

Optionally, in this embodiment of this application, the operation mode configuration information is activated or deactivated by the network-side device through system information, RRC signaling, MAC signaling, or PHY signaling; where the PHY signaling is a PDCCH order, the PDCCH order is used to define a target radio network temporary identifier (RNTI), and the target RNTI is used to activate or deactivate the operation mode configuration information.

Optionally, in this embodiment of this application, in a case that the operation mode includes the frequency-domain operation mode, the operation mode configuration information includes at least one of the following: a start point and an end point of an operating subband corresponding to the frequency-domain operation mode; and power spectral density, transmit power, or signal amplification multiple of the operating subband.

Optionally, in this embodiment of this application, in a case that the operation mode includes the time-domain operation mode, the operation mode configuration information includes at least one of the following:

a start point and an end point of an operation window corresponding to the time-domain operation mode;

a length of the operation window; or a cycle of the operation window; where the start point of the operation window is configured with respect to an offset parameter for a time point.

For example, the network-side device may directly configure one operation window of the intelligent signal amplifier based on needs, including a start point, a length/end point, and transmit power density. The start point may be explicitly configured using a parameter or defined as the time when a configuration command is received. When an operation window ends, a non-operating state resumes.

Optionally, in this embodiment of this application, the time-domain operation mode includes at least one of the following:

first time-domain operation mode;

continuous operation mode;

discontinuous operation mode; or composite time-domain operation mode; where the first time-domain operation mode satisfies any one of the following:

downlink (DL) only supports amplification or forwarding of a transmit interval of a synchronization signal/physical broadcast channel signal block (or synchronization signal block) (Synchronization Signal and PBCH block, SSB) or a CSI reference signal (CSI-RS) used to detect a signal; and uplink (UL) only supports amplification or forwarding of a PRACH transmit window;

the composite time-domain operation mode is a time-domain operation mode obtained by combining multiple time-domain operation modes that are configured by the network-side device for the intelligent signal amplifier; and each time-domain operation mode includes at least one operation window.

Further optionally, in this embodiment of this application, in a case that the first time-domain operation mode is a lowest time-domain operation mode, the lowest time-domain operation mode may include one or more periodic operation windows. It should be noted that the first time-domain operation mode is intended to provide at least cell discovery signal coverage and random access signal coverage during low network load.

Further optionally, in this embodiment of this application, an operation window corresponding to the first time-domain operation mode (for example, the lowest time-domain operation mode) is determined based on any one of the following:

a window for forwarding target information determined by the intelligent signal amplifier based on the detected target information; and a PRACH resource window of a cell detected by the intelligent signal amplifier; where the target information includes at least one of the following: SSB, CSI-RS, PRACH signal, or cell broadcast information.

For example, methods for determining the operation window corresponding to the first time-domain operation mode include at least the following two methods.

Method 1. The intelligent signal amplifier may autonomously determine the operation window corresponding to the lowest time-domain operation mode.

For example, the intelligent signal amplifier may determine a window for forwarding an SSB signal based on a detected SSB, or may determine a window for forwarding a PRACH signal based on received PRACH configuration.

Method 2. The intelligent signal amplifier may receive forwarding window configuration from the network-side device. Configuration for sending/forwarding a CSI-RS used as a discovery signal is included.

Figure 4:
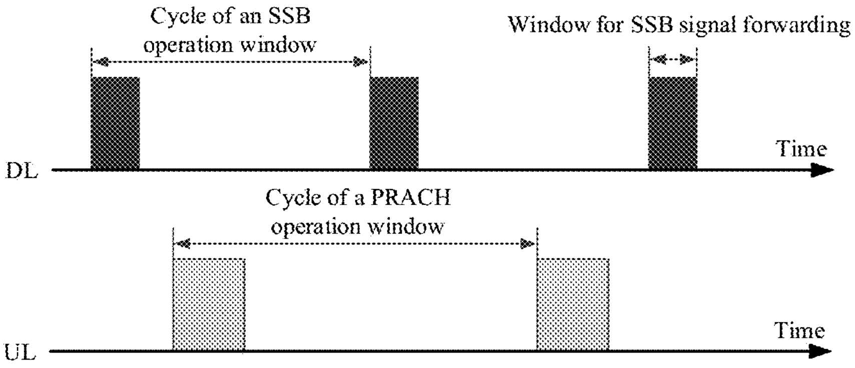
FIG. 4 is a second operation mode schematic diagram of an intelligent signal amplifier operation mode configuration method according to an embodiment of this application.

For example, in a scenario of the first time-domain operation mode, in downlink it is for only for amplification or forwarding during a transmit interval of SSB or CSI-RS signal for discovery. FIG. 4 shows a schematic diagram of several operation windows for downlink forwarding. Three downlink operation windows for SSB signal forwarding (DL operation window for SSB signal forwarding), as well as a cycle of an SSB operation window (SSB cycle), are included.

For example, in a scenario of the first time-domain operation mode, in uplink it is only for amplification or forwarding in a PRACH transmit window. FIG. 4 shows a schematic diagram of several operation windows for uplink forwarding. In a case that at least one PRACH is included, two uplink operation windows for PRACH signal forwarding (UL operation window for PRACH signal forwarding), as well as a cycle of a PRACH operation window (PRACH window cycle), are included.

Further optionally, in this embodiment of this application, regarding the discontinuous operation mode, one or more time-domain may generally be configured for the intelligent signal amplifier, and a sequence number may be configured for each operation mode. Configuration information corresponding to the discontinuous operation mode configuration may include: a start point, an end point, and a length of an operation window, and an operation cycle of the operation window. An offset parameter for a time point corresponding to the start point of the operation window may be referred to as offset.

Figure 5:
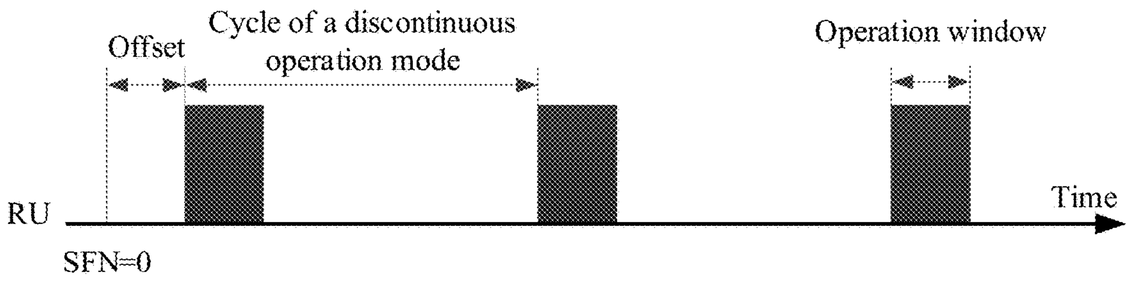
FIG. 5 is a third operation mode schematic diagram of an intelligent signal amplifier operation mode configuration method according to an embodiment of this application.

For example, refer to a schematic diagram of the discontinuous operation mode shown in FIG. 5. In FIG. 5, the horizontal axis is time, and three operation windows (Operation window) are included in the horizontal axis of time. In addition, FIG. 5 further shows a cycle of the discontinuous operation mode of an RU (RU discontinuous operation cycle), and a start point, an end point, and a length of each operation window. An offset parameter for a time point corresponding to this operation mode is offset.

Further optionally, in this embodiment of this application, regarding the composite time-domain operation mode, the composite time-domain operation mode may be a time-domain operation mode obtained by combining multiple time-domain operation modes that are configured by the network-side device for the intelligent signal amplifier. For example, while the lowest time-domain operation mode stays active for the intelligent signal amplifier, the operation mode shown in FIG. 5 is activated.

It should be noted that in this embodiment of this application, the time-domain operation mode and the frequency-domain operation mode are allowed to be configured simultaneously and to be in an active state simultaneously. In this case, the intelligent signal amplifier is in the composite time-domain frequency-domain operation mode.

Optionally, in this embodiment of this application, in a case that the operation mode includes the time-domain operation mode, the method provided by this embodiment of this application further includes step 204.

Step 204. The intelligent signal amplifier adjusts a parameter of an operation window corresponding to the target time-domain operation mode.

In an example, the intelligent signal amplifier can autonomously adjust the time-domain operation mode, for example, autonomously adjusting a length of an operation window of a time-domain operation mode or extending an operation window based on a forwarding parameter configured by the network-side device.

In this way, the intelligent signal amplifier can adjust the time-domain operation mode flexibly based on system load, so as to achieve effective use of system power.

Optionally, in this embodiment of this application, step 203 may include step 203*a*.

Step 203*a*. The intelligent signal amplifier activates, deactivates, or switches to a target operation mode based on the operation mode configuration information.

For example, in a case of setting a target operation mode, the intelligent signal amplifier may set the target operation mode based on an instruction sent by the network-side device, or autonomously and adaptively adjust the operation mode. This is not limited in this embodiment of this application.

Figure 6:
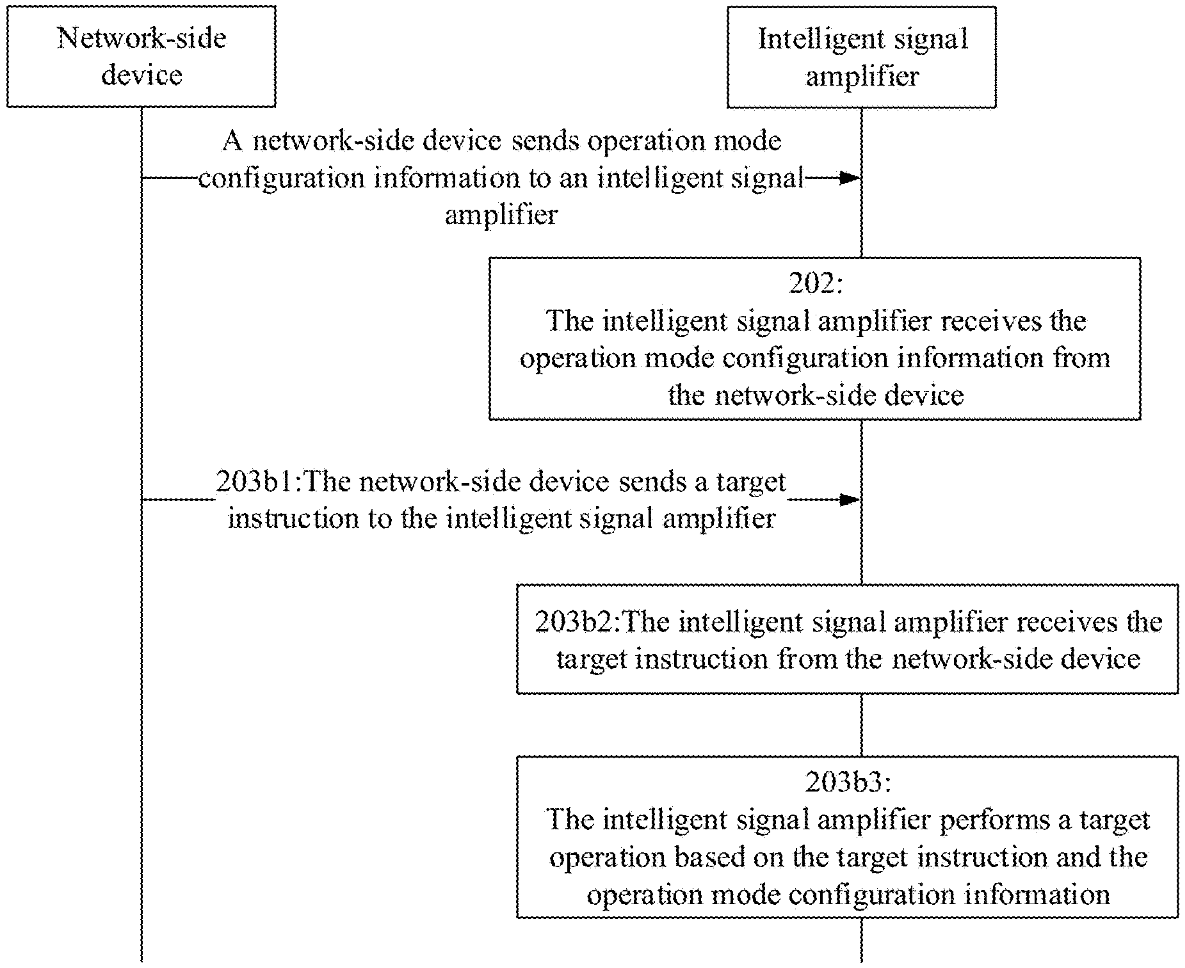
FIG. 6 is a second flowchart of an intelligent signal amplifier operation mode configuration method according to an embodiment of this application.

Optionally, in this embodiment of this application, as shown in FIG. 6, step 203 may include step 203*b*1 to step 203*b*3.

Step 203*b*1. The network-side device sends a target instruction to the intelligent signal amplifier.

Step 203*b*2. The intelligent signal amplifier receives the target instruction from the network-side device.

The target instruction is used to indicate the intelligent signal amplifier to perform a target operation.

Step 203*b*3. The intelligent signal amplifier performs a target operation based on the target instruction and the operation mode configuration information.

The target operation includes activating, deactivating, or switching to the target operation mode.

For example, operation mode switching may be implemented based on an explicit instruction from the network-side device. The network-side device (for example, a base station) sends an operation mode switching command to an RU through the MT, and the switching command carriers a target operation mode. After receiving the switching command, the RU switches to the target operation mode. Upon receipt of the operation mode switching command, the MT sends to the network-side device a response message indicating that the switching command is received.

In an example, the intelligent signal amplifier may receive a time-domain operation mode switching instruction from the network-side device, and switches from the continuous operation mode to another discontinuous operation mode.

In another example, the intelligent signal amplifier may receive from the network-side device a time-domain operation mode activation or deactivation instruction for activating or deactivating one or more time-domain operation modes.

Optionally, in this embodiment of this application, the intelligent signal amplifier can autonomously adjust the operation mode.

For example, step 203 may include step 203*c*1.

Step 203*c*1. The intelligent signal amplifier switches to the target operation mode based on bandwidth scheduled by the network-side device and the operation mode configuration information.

For example, the intelligent signal amplifier switches to the target operation mode matching the scheduled bandwidth based on the bandwidth scheduled by the network-side device and the operation mode configuration information, in a case that the bandwidth scheduled by the network-side device exceeds current operation bandwidth of the intelligent signal amplifier or an absolute value of a difference between the bandwidth scheduled by the network-side device and the current operation bandwidth of the intelligent signal amplifier is greater than or equal to a predetermined threshold.

For example, the bandwidth scheduled by the network-side device is determined based on at least one of the following:

- an operation bandwidth indicated by the network-side device;
- a subband bandwidth indication carried when the network-side device configures a beamforming parameter for any one operating subband of the intelligent signal amplifier; or
- a subband bandwidth indication carried when the network-side device configures a transmit power spectral density parameter for any one operating subband of the intelligent signal amplifier.

Optionally, in this embodiment of this application, the intelligent signal amplifier operation mode configuration method provided in this embodiment of this application further includes step 205.

Step 205. The network-side device activates or deactivates the operation mode configuration information through system information, RRC signaling, MAC signaling, or PHY signaling.

The PHY signaling is a PDCCH order, the PDCCH order is used to define a target RNTI, and the target RNTI is used to activate or deactivate the operation mode configuration information.

For example, the operation mode configuration information may be sent by the network-side device to the intelligent signal amplifier through RRC signaling, and then the network-side device performs activation/deactivation through MAC/PHY signaling.

In the intelligent signal amplifier operation mode configuration method provided by the embodiments of this application, the intelligent signal amplifier receives operation mode configuration information from the network-side device, and sets a target operation mode based on the operation mode configuration information, where the operation mode configuration information is used for configuring N operation modes for the intelligent signal amplifier. The N operation modes include at least one of the following: frequency-domain operation mode or time-domain operation mode; and the target operation mode is at least one of the N operation modes. In this way, the network-side device can configure different operation mode information for the intelligent signal amplifier based on different network loads, or the intelligent signal amplifier adaptively switches between operation modes, avoiding power consumption and electricity loss and reducing interference with the intelligent signal amplifier.

It should be noted that the intelligent signal amplifier operation mode configuration method provided by this embodiment of this application may be performed by an intelligent signal amplifier operation mode configuration apparatus, or a control module of the intelligent signal amplifier operation mode configuration apparatus for performing the intelligent signal amplifier operation mode configuration method. In this embodiment of this application, an example, in which the intelligent signal amplifier operation mode configuration apparatus performs the intelligent signal amplifier operation mode configuration method, is used to describe the intelligent signal amplifier operation mode configuration apparatus provided by an embodiment of this application.

Figure 7:
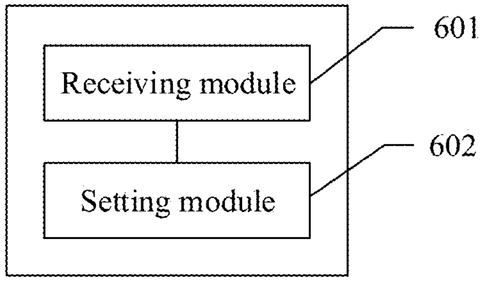
FIG. 7 is a first schematic structural diagram of an intelligent signal amplifier operation mode configuration apparatus according to an embodiment of this application.

An embodiment of this application provides an intelligent signal amplifier operation mode configuration apparatus. As shown in FIG. 7, the intelligent signal amplifier operation mode configuration apparatus includes a receiving module 601 and a setting module 602.

The receiving module 601 is configured to receive operation mode configuration information from a network-side device.

The setting module 602 is configured to set a target operation mode for the intelligent signal amplifier based on the operation mode configuration information received by the receiving module 601.

The operation mode configuration information is used for configuring N operation modes for the intelligent signal amplifier.

Optionally, the N operation modes include at least one of the following: frequency-domain operation mode or time-domain operation mode.

Optionally, one frequency-domain operation mode corresponds to one set of frequency-domain operating subband configuration parameters; and one time-domain operation mode corresponds to one set of operation window configuration parameters.

Optionally, the operation mode configuration information is at least used to configure an operation mode of a radio frequency unit for signal forwarding in the intelligent signal amplifier.

Optionally, the target operation mode is at least one of the N operation modes.

Optionally, in this embodiment of this application, the setting module is specifically configured to activate, deactivate, or switch to a target operation mode based on the operation mode configuration information received by the receiving module 601.

Optionally, in this embodiment of this application, in a case that the operation mode includes the frequency-domain operation mode, the operation mode configuration information includes at least one of the following:

- a start point and an end point of an operating subband corresponding to the frequency-domain operation mode; or
- power spectral density, transmit power, or signal amplification multiple of the operating subband.

Optionally, in this embodiment of this application, in a case that the operation mode includes the time-domain operation mode, the operation mode configuration information includes at least one of the following: a start point and an end point of an operating subband corresponding to the time-domain operation mode; a length of the operation window; or a cycle of the operation window.

Optionally, the start point of the operation window is configured with respect to an offset parameter for a time point.

Optionally, in this embodiment of this application, the time-domain operation mode includes at least one of the following: first time-domain operation mode; discontinuous operation Optionally, the first time-domain operation mode satisfies any one of the following: in downlink it is for only for amplification or forwarding during a transmit interval of SSB or CSI-RS signal for discovery; and in uplink it is only for amplification or forwarding in a PRACH transmit window.

Optionally, the composite time-domain operation mode is a time-domain operation mode obtained by combining multiple time-domain operation modes that are configured by the network-side device for the intelligent signal amplifier.

Each time-domain operation mode includes at least one operation window.

Optionally, in this embodiment of this application, an operation window corresponding to the first time-domain operation mode is determined based on any one of the following:

- a window for forwarding target information determined by the intelligent signal amplifier based on the detected target information; and
- a PRACH resource window of a cell detected by the intelligent signal amplifier.

The target information includes at least one of the following: SSB, CSI-RS, PRACH signal, or cell broadcast information.

Optionally, in this embodiment of this application:

- the receiving module 601 is further configured to receive a target instruction from the network-side device, where the target instruction is used to indicate the intelligent signal amplifier to perform a target operation; and
- the setting module 602 is specifically configured to perform the target operation based on the target instruction received by the receiving module 601 and the operation mode configuration information received by the receiving module 601; where the target operation includes activating, deactivating, or switching to the target operation mode.

Optionally, in this embodiment of this application, the setting module 602 is specifically configured to switch to the target operation mode based on bandwidth scheduled by the network-side device and the operation mode configuration information received by the receiving module 601.

Optionally, in this embodiment of this application, the setting module 602 is further configured to switch to the target operation mode matching the scheduled bandwidth based on the bandwidth scheduled by the network-side device and the operation mode configuration information received by the receiving module 601, in a case that the bandwidth scheduled by the network-side device exceeds current operation bandwidth of the intelligent signal amplifier or an absolute value of a difference between the bandwidth scheduled by the network-side device and the current operation bandwidth of the intelligent signal amplifier is greater than or equal to a predetermined threshold.

Optionally, the bandwidth scheduled by the network-side device is determined based on at least one of the following:

- an operation bandwidth indicated by the network-side device;
- a subband bandwidth indication carried when the network-side device configures a beamforming parameter for any one operating subband of the intelligent signal amplifier; or
- a subband bandwidth indication carried when the network-side device configures a transmit power spectral density parameter for any one operating subband of the intelligent signal amplifier.

Optionally, each operation mode corresponds to a forwarding power configuration parameter.

Optionally, in this embodiment of this application, the intelligent signal amplifier operation mode configuration apparatus further includes an adjusting module, where:

- the adjusting module is configured to adjust a parameter of an operation window corresponding to a target time-domain operation mode in a case that the operation mode includes the time-domain operation mode.

Optionally, the time-domain operation mode and the frequency-domain operation mode are allowed to be configured simultaneously and to be in an active state simultaneously.

Optionally, the operation mode configuration information is activated or deactivated by the network-side device through system information, RRC signaling, MAC signaling, or PHY signaling; where the PHY signaling is a PDCCH order, the PDCCH order is used to define a target RNTI, and the target RNTI is used to activate or deactivate the operation mode configuration information.

In the intelligent signal amplifier operation mode configuration apparatus provided by this embodiment of this application, the intelligent signal amplifier receives operation mode configuration information from the network-side device, and sets a target operation mode based on the operation mode configuration information, where the operation mode configuration information is used for configuring N operation modes for the intelligent signal amplifier. The N operation modes include at least one of the following: frequency-domain operation mode or time-domain operation mode; and the target operation mode is at least one of the N operation modes. In this way, the network-side device can configure different operation mode information for the intelligent signal amplifier based on different network loads, or the intelligent signal amplifier adaptively switches between operation modes, avoiding power consumption and electricity loss and reducing interference with the intelligent signal amplifier.

Figure 8:
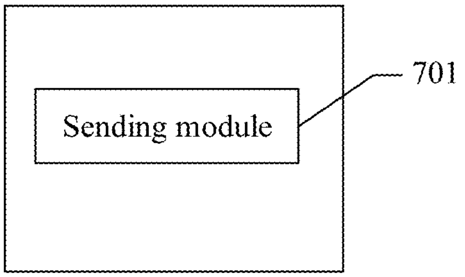
FIG. 8 is a second schematic structural diagram of an intelligent signal amplifier operation mode configuration apparatus according to an embodiment of this application.

An embodiment of this application provides an intelligent signal amplifier operation mode configuration apparatus. As shown in FIG. 8, the operation mode configuration apparatus includes a sending module 701.

The sending module 701 is configured to send operation mode configuration information to the intelligent signal amplifier.

Optionally, the operation mode configuration information is used for configuring N operation modes for the intelligent signal amplifier.

Optionally, the N operation modes include at least one of the following: frequency-domain operation mode or time-domain operation mode.

Optionally, one frequency-domain operation mode corresponds to one set of frequency-domain operating subband configuration parameters; and one time-domain operation mode corresponds to one set of operation window configuration parameters.

Optionally, the operation mode configuration information is at least used to configure an operation mode of a radio frequency unit for signal forwarding in the intelligent signal amplifier.

Optionally, the target operation mode is at least one of the N operation modes.

Optionally, in this embodiment of this application, in a case that the operation mode includes the frequency-domain operation mode, the operation mode configuration information includes at least one of the following: a start point and an end point of an operating subband corresponding to the frequency-domain operation mode; and power spectral density, transmit power, or signal amplification multiple of the operating subband.

Optionally, in this embodiment of this application, in a case that the operation mode includes the time-domain operation mode, the operation mode configuration information includes at least one of the following: a start point and an end point of an operating subband corresponding to the time-domain operation mode; a length of the operation window; and a cycle of the operation window.

The start point of the operation window is configured with respect to an offset parameter for a time point.

Optionally, in this embodiment of this application, the time-domain operation mode includes at least one of the following: first time-domain operation mode; discontinuous operation mode; or composite time-domain operation mode.

Optionally, the first time-domain operation mode satisfies any one of the following: in downlink it is for only for amplification or forwarding during a transmit interval of SSB or CSI-RS signal for discovery; and in uplink it is only for amplification or forwarding in a PRACH transmit window.

Optionally, the composite time-domain operation mode is a time-domain operation mode obtained by combining multiple time-domain operation modes that are configured by the network-side device for the intelligent signal amplifier.

Each time-domain operation mode includes at least one operation window.

Optionally, in this embodiment of this application, an operation window corresponding to the first time-domain operation mode is determined based on the following window: a window corresponding to target information sent by the network-side device to the intelligent signal amplifier.

The target information includes at least one of the following: SSB, CSI-RS, PRACH signal, or cell broadcast information.

Optionally, in this embodiment of this application, the sending module is further configured to send a target instruction to the intelligent signal amplifier.

The target instruction is used to indicate the intelligent signal amplifier to perform a target operation; and the target operation includes activating, deactivating, or switching to the target operation mode.

Optionally, in an embodiment of this application, each operation mode corresponds to a forwarding power configuration parameter.

Optionally, in an embodiment of this application, the time-domain operation mode and the frequency-domain operation mode are allowed to be configured simultaneously and to be in an active state simultaneously.

Optionally, in an embodiment of this application, the sending module is specifically configured to activate or deactivate the operation mode configuration information through system information, RRC signaling, MAC signaling, or PHY signaling; where the PHY signaling is a PDCCH order, the PDCCH order is used to define a target RNTI, and the target RNTI is used to activate or deactivate the operation mode configuration information.

In the intelligent signal amplifier operation mode configuration apparatus provided by this embodiment of this application, the network-side device sends operation mode configuration information to the intelligent signal amplifier, where the operation mode configuration information is used for configuring N operation modes for the intelligent signal amplifier. The N operation modes include at least one of the following: frequency-domain operation mode or time-domain operation mode; and the target operation mode is at least one of the N operation modes. In this way, the network-side device can configure different operation mode information for the intelligent signal amplifier based on different network loads, avoiding power consumption and electricity loss and reducing interference with the intelligent signal amplifier.

The intelligent signal amplifier operation mode configuration apparatus in this embodiment of this application may be an apparatus or an apparatus or electronic device with an operating system, or may be a component, an integrated circuit, or a chip of a terminal. The apparatus or electronic device may be a mobile terminal or a non-mobile terminal. For example, the mobile terminal may include but is not limited to a type of the foregoing terminal 11, and the non-mobile terminal may be a server, a network attached storage (NAS), a personal computer (PC), a television (TV), a teller machine, a self-service machine, or the like. This is not specifically limited in the embodiments of this application.

The intelligent signal amplifier operation mode configuration apparatus provided in this embodiment of this application can implement the processes implemented by the method embodiments illustrated in FIG. 2 and FIG. 6, with the same technical effects achieved. To avoid repetition, details are not described herein again.

Figure 9:
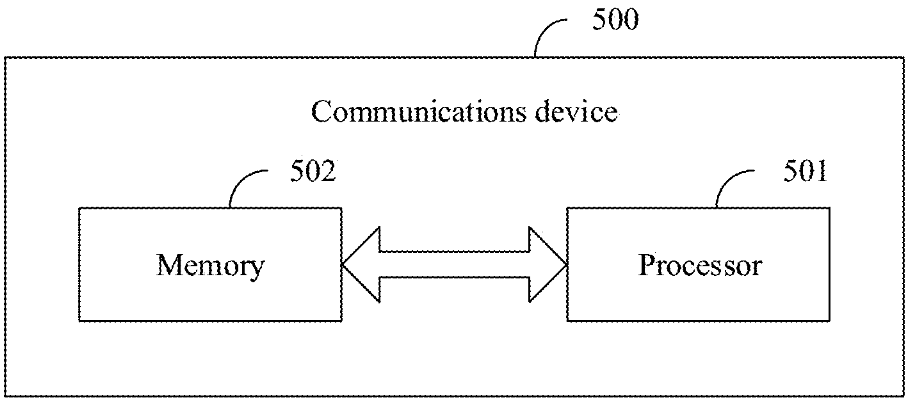
FIG. 9 is a schematic structural diagram of a communication device according to an embodiment of this application.

Optionally, as shown in FIG. 9, an embodiment of this application further provides a communication device 500, including a processor 501, a memory 502, and a program or instructions stored in the memory 502 and capable of running on the processor 501. For example, in a case that the communication device 500 is a terminal, and the program or instructions are executed by the processor 501, the processes in the embodiments of the forgoing intelligent signal amplifier operation mode configuration method are implemented, and the same technical effects can be achieved. In a case that the communication device 500 is a network-side device, when the program or instructions are executed by the processor 501, the processes in the embodiments of the forgoing intelligent signal amplifier operation mode configuration method are implemented, with the same technical effects achieved. To avoid repetition, details are not described herein again.

An embodiment of this application further provides an intelligent signal amplifier, including a processor and a communication interface. The communication interface is used to receive operation mode configuration information from a network-side device, and the processor is used to set a target operation mode based on the operation mode configuration information, where the operation mode configuration information is used for configuring N operation modes for the intelligent signal amplifier; the N operation modes include at least one of the following: frequency-domain operation mode or time-domain operation mode; and the target operation mode is at least one of the N operation modes. The intelligent signal amplifier embodiment is corresponding to the foregoing method embodiments used on the terminal side. All the implementation processes and implementation methods of the foregoing method embodiments can be applied to the terminal embodiment, with the same technical effects achieved.

Figure 10:
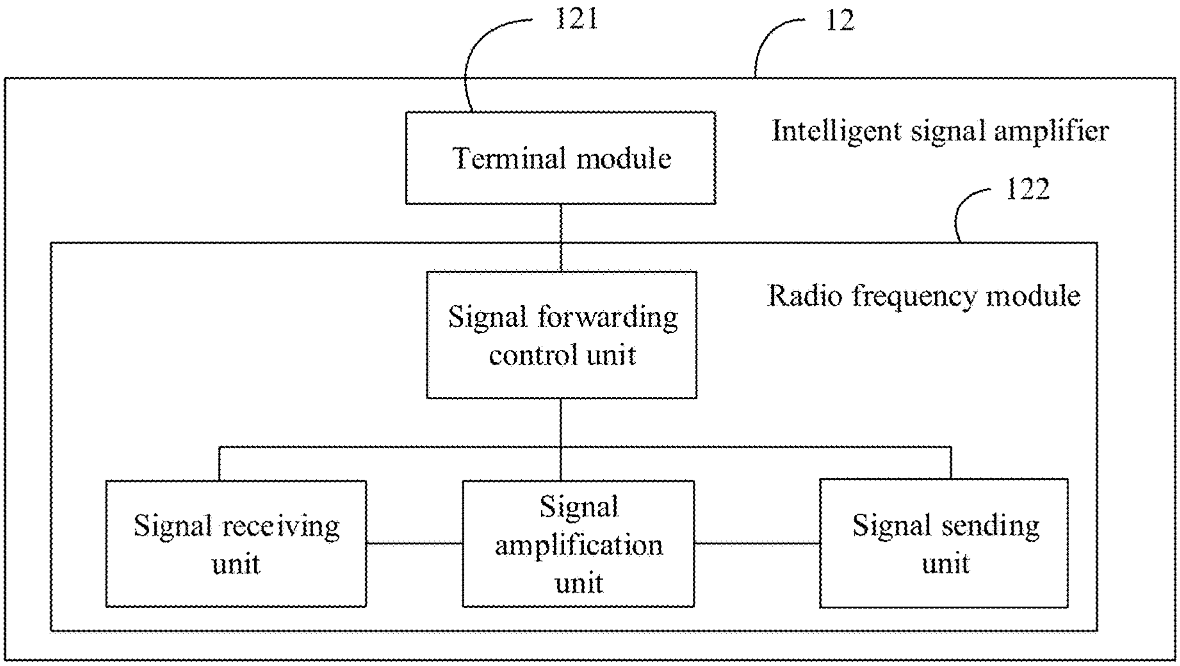
FIG. 10 is a schematic diagram of a hardware structure of an intelligent signal amplifier according to an embodiment of this application.

Specifically, an embodiment of this application further provides an intelligent signal amplifier. As shown in FIG. 10, the intelligent signal amplifier includes a terminal module 121 and a radio frequency module 122, where the radio frequency module 122 includes a signal forwarding control unit, a signal receiving unit, a signal amplification unit, and a signal sending unit.

The terminal module 121 is configured to receive operation mode configuration information from a network-side device, and the signal forwarding control unit is configured to set a target operation mode based on the operation mode configuration information, where the operation mode configuration information is used for configuring N operation modes for the intelligent signal amplifier; the N operation modes include at least one of the following: frequency-domain operation mode or time-domain operation mode; and the target operation mode is at least one of the N operation modes. The intelligent signal amplifier embodiment is corresponding to the foregoing method embodiments used on the terminal side.

Optionally, the N operation modes include at least one of the following: frequency-domain operation mode or time-domain operation mode.

Optionally, one frequency-domain operation mode corresponds to one set of frequency-domain operating subband configuration parameters; and one time-domain operation mode corresponds to one set of operation window configuration parameters.

Optionally, the target operation mode is at least one of the N operation modes.

Optionally, in this embodiment of this application, the signal forwarding control unit is specifically configured to activate, deactivate, or switch to a target operation mode based on the operation mode configuration information received by the terminal module 121.

Optionally, in this embodiment of this application, in a case that the operation mode includes the frequency-domain operation mode, the operation mode configuration information includes at least one of the following:

- a start point and an end point of an operating subband corresponding to the frequency-domain operation mode; or
- power spectral density, transmit power, or signal amplification multiple of the operating subband.

Optionally, in this embodiment of this application, in a case that the operation mode includes the time-domain operation mode, the operation mode configuration information includes at least one of the following: a start point and an end point of an operating subband corresponding to the time-domain operation mode; a length of the operation window; or a cycle of the operation window.

Optionally, the start point of the operation window is configured with respect to an offset parameter for a time point.

Optionally, in this embodiment of this application, the time-domain operation mode includes at least one of the following: first time-domain operation mode; discontinuous operation Optionally, the first time-domain operation mode satisfies any one of the following: in downlink it is for only for amplification or forwarding during a transmit interval of SSB or CSI-RS signal for discovery; and in uplink it is only for amplification or forwarding in a PRACH transmit window.

Optionally, the composite time-domain operation mode is a time-domain operation mode obtained by combining multiple time-domain operation modes that are configured by the network-side device for the intelligent signal amplifier.

Each time-domain operation mode includes at least one operation window.

Optionally, in this embodiment of this application, an operation window corresponding to the first time-domain operation mode is determined based on any one of the following:

- a window for forwarding target information determined by the intelligent signal amplifier based on the detected target information; and
- a PRACH resource window of a cell detected by the intelligent signal amplifier.

The target information includes at least one of the following: SSB, CSI-RS, PRACH signal, or cell broadcast information.

Optionally, in this embodiment of this application, the terminal module 121 is further configured to receive a target instruction from the network-side device, where the target instruction is used to indicate the intelligent signal amplifier to perform a target operation.

The signal forwarding control unit is specifically configured to perform the target operation based on the target instruction received by the terminal module 121 and the operation mode configuration information; where the target operation includes activating, deactivating, or switching to the target operation mode.

Optionally, in this embodiment of this application, the signal forwarding control unit is specifically configured to switch to the target operation mode based on bandwidth scheduled by the network-side device and the operation mode configuration information received by the terminal module 121.

Optionally, in this embodiment of this application, the signal forwarding control unit is further configured to switch to the target operation mode matching the scheduled bandwidth based on the bandwidth scheduled by the network-side device and the operation mode configuration information received by the terminal module 121, in a case that the bandwidth scheduled by the network-side device exceeds current operation bandwidth of the intelligent signal amplifier or an absolute value of a difference between the bandwidth scheduled by the network-side device and the current operation bandwidth of the intelligent signal amplifier is greater than or equal to a predetermined threshold.

Optionally, the bandwidth scheduled by the network-side device is determined based on at least one of the following:

an operation bandwidth indicated by the network-side device;

a subband bandwidth indication carried when the network-side device configures a beamforming parameter for any one operating subband of the intelligent signal amplifier; or a subband bandwidth indication carried when the network-side device configures a transmit power spectral density parameter for any one operating subband of the intelligent signal amplifier.

Optionally, each operation mode corresponds to a forwarding power configuration parameter.

Optionally, the signal forwarding control unit is configured to adjust a parameter of an operation window corresponding to a target time-domain operation mode in a case that the operation mode includes the time-domain operation mode.

Optionally, the time-domain operation mode and the frequency-domain operation mode are allowed to be configured simultaneously and to be in an active state simultaneously.

Optionally, the operation mode configuration information is activated or deactivated by the network-side device through system information, RRC signaling, MAC signaling, or PHY signaling; where the PHY signaling is a PDCCH order, the PDCCH order is used to define a target RNTI, and the target RNTI is used to activate or deactivate the operation mode configuration information.

In the intelligent signal amplifier provided by this embodiment of this application, the terminal module of the intelligent signal amplifier receives operation mode configuration information from the network-side device, and the signal forwarding control unit sets a target operation mode based on the operation mode configuration information, where the operation mode configuration information is used for configuring N operation modes for the intelligent signal amplifier. The N operation modes include at least one of the following: frequency-domain operation mode or time-domain operation mode; and the target operation mode is at least one of the N operation modes. In this way, the network-side device can configure different operation mode information for the intelligent signal amplifier based on different network loads, or the intelligent signal amplifier adaptively switches between operation modes, avoiding power consumption and electricity loss and reducing interference with the intelligent signal amplifier.

An embodiment of this application further provides a network-side device, including a processor and a communication interface. The processor is used to send operation mode configuration information to an intelligent signal amplifier; where the operation mode configuration information is used for configuring N operation modes for the intelligent signal amplifier; the N operation modes include at least one of the following: frequency-domain operation mode or time-domain operation mode; and a target operation mode is at least one of the N operation modes. The network-side device embodiment is corresponding to the foregoing method embodiments applied to the network-side device. All the implementation processes and implementation methods of the foregoing method embodiments can be applied to the network-side device embodiment, with the same technical effects achieved.

Figure 11:
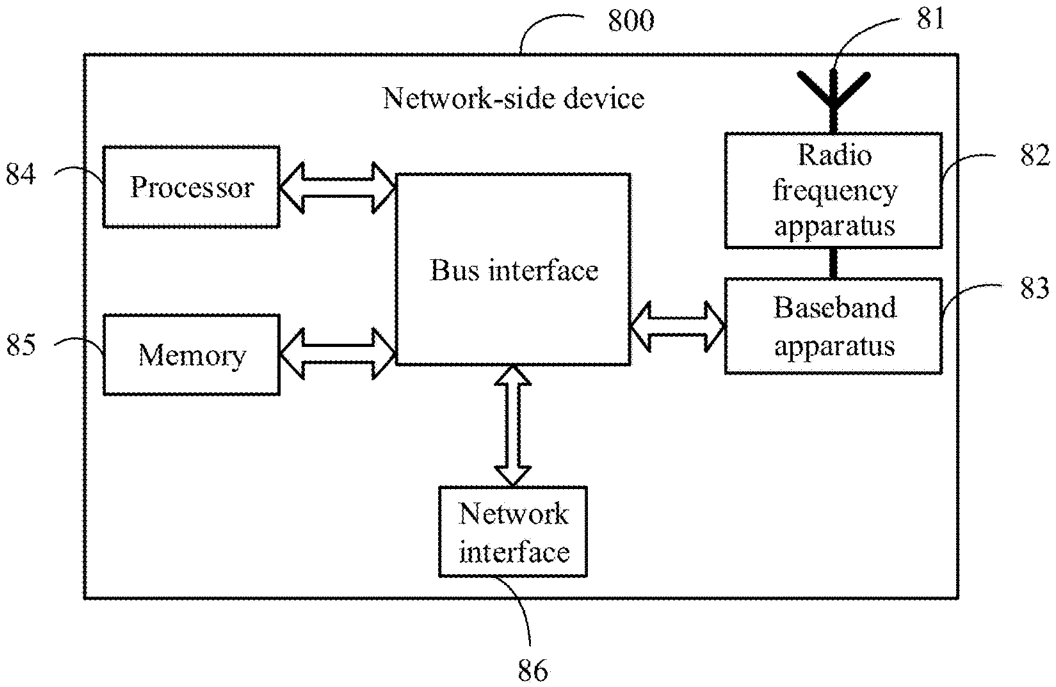
FIG. 11 is a schematic diagram of a hardware structure of a network-side device according to an embodiment of the present invention.

Specifically, an embodiment of this application further provides a network-side device. As shown in FIG. 11, a network-side device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and transmits the received information to the baseband apparatus 83 for processing. In a downlink direction, the baseband apparatus 83 processes to-be-transmitted information, and transmits the information to the radio frequency apparatus 82; and the radio frequency apparatus 82 processes the received information and then transmits the information by using the antenna 81.

The foregoing frequency band processing apparatus may be located in the baseband apparatus 83. The method performed by the network-side device in the foregoing embodiment may be implemented by the baseband apparatus 83, and the baseband apparatus 83 includes a processor 84 and a memory 85.

The baseband apparatus 83 may include, for example, at least one baseband processing unit, where a plurality of chips are disposed on the baseband processing unit. As shown in FIG. 11, one of the chips is, for example, the processor 84, and connected to the memory 85, to invoke a program in the memory 85 to perform the operations of the network-side device shown in the foregoing method embodiment.

The baseband apparatus 83 may further include a network interface 86, configured to exchange information with the radio frequency apparatus 82, where the interface is, for example, a common public radio interface (CPRI).

Specifically, the network-side device according to this embodiment of this application further includes a program or instructions stored in the memory 85 and capable of running on the processor 84. The processor 84 invokes the program or instructions in the memory 85 to implement the method performed by each module shown in FIG. 9, and the same technical effects are achieved. To avoid repetition, details are not described herein again.

An embodiment of this application further provides a readable storage medium, and the readable storage medium stores a program or instructions. When the program or instructions are executed by a processor, the processes in the embodiments of the foregoing intelligent signal amplifier operation mode configuration method are implemented, and the same technical effects are achieved. To avoid repetition, details are not described herein again.

The processor is the processor in the terminal in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions to implement the processes in the embodiments of the foregoing intelligent signal amplifier operation mode configuration method, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a computer software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An intelligent signal amplifier operation mode configuration method, comprising:

receiving, by an intelligent signal amplifier, operation mode configuration information from a network-side device; and setting, by the intelligent signal amplifier based on the operation mode configuration information, a target operation mode; wherein the operation mode configuration information is used for configuring N operation modes for the intelligent signal amplifier;

the N operation modes comprise at least one of the following: frequency-domain operation mode or time-domain operation mode; and the target operation mode is at least one of the N operation modes, wherein the method further comprises:

receiving, by the intelligent signal amplifier, RRC signaling or PHY signaling from the network-side device, wherein the RRC signaling or PHY signaling is used to activate or deactivate the operation mode configuration information of the target operation mode.

2. The method according to claim 1, wherein one frequency-domain operation mode corresponds to one set of frequency-domain operating subband configuration parameters; and one time-domain operation mode corresponds to one set of operation window configuration parameters.

3. The method according to claim 1, the setting, by the intelligent signal amplifier based on the operation mode configuration information, a target operation mode comprises:

activating, deactivating, or switching to, by the intelligent signal amplifier based on the operation mode configuration information, the target operation mode.

4. The method according to claim 3, the switching, by the intelligent signal amplifier based on the operation mode configuration information, to the target operation mode comprises:

switching, by the intelligent signal amplifier, to the target operation mode based on bandwidth scheduled by the network-side device and the operation mode configuration information.

5. The method according to claim 4, the switching, by the intelligent signal amplifier, to the target operation mode based on bandwidth scheduled by the network-side device and the operation mode configuration information comprises:

in a case that the bandwidth scheduled by the network-side device exceeds current operation bandwidth of the intelligent signal amplifier or an absolute value of a difference between the bandwidth scheduled by the network-side device and the current operation bandwidth of the intelligent signal amplifier is greater than or equal to a predetermined threshold, switching to the target operation mode matching the scheduled bandwidth based on the bandwidth scheduled by the network-side device and the operation mode configuration information.

6. The method according to claim 5, wherein the bandwidth scheduled by the network-side device is determined based on at least one of the following:

an operation bandwidth indicated by the network-side device;

a subband bandwidth indication carried when the network-side device configures a beamforming parameter for any one operating subband of the intelligent signal amplifier; or a subband bandwidth indication carried when the network-side device configures a transmit power spectral density parameter for any one operating subband of the intelligent signal amplifier.

7. The method according to claim 1, wherein in a case that the operation modes comprise the frequency-domain operation mode, the operation mode configuration information comprises at least one of the following:

a start point and an end point of an operating subband corresponding to the frequency-domain operation mode; or power spectral density, transmit power, or signal amplification multiple of the operating subband.

8. The method according to claim 1, wherein in a case that the operation mode comprises the time-domain operation mode, the operation mode configuration information comprises at least one of the following:

a start point and an end point of an operation window corresponding to the time-domain operation mode;

a length of the operation window; or a cycle of the operation window; wherein the start point of the operation window is configured with respect to an offset parameter for a time point.

9. The method according to claim 1, wherein the time-domain operation mode comprises at least one of the following:

first time-domain operation mode;

discontinuous operation mode; or composite time-domain operation mode; wherein the first time-domain operation mode satisfies any one of the following:

in downlink it is only for amplification or forwarding during a transmit interval of SSB or CSI-RS signal for discovery; and in uplink it is only for amplification or forwarding in a PRACH transmit window;

the composite time-domain operation mode is a time-domain operation mode obtained by combining multiple time-domain operation modes that are configured by the network-side device for the intelligent signal amplifier; and each time-domain operation mode comprises at least one operation window.

10. The method according to claim 9, wherein an operation window corresponding to the first time-domain operation mode is determined based on any one of the following:

a window for forwarding target information that is determined by the intelligent signal amplifier based on the detected target information; and a PRACH resource window of a cell detected by the intelligent signal amplifier; wherein the target information comprises at least one of the following: SSB, CSI-RS, PRACH signal, or cell broadcast information.

11. The method according to claim 1, the setting, by the intelligent signal amplifier based on the operation mode configuration information, a target operation mode comprises:

receiving, by the intelligent signal amplifier, a target instruction from the network-side device, wherein the target instruction is used to indicate the intelligent signal amplifier to perform a target operation; and performing, by the intelligent signal amplifier, the target operation based on the target instruction and the operation mode configuration information; wherein the target operation comprises activating, deactivating, or switching to the target operation mode.

12. The method according to claim 1, wherein each operation mode corresponds to a forwarding power configuration parameter.

13. The method according to claim 1, wherein in a case that the operation mode comprises the time-domain operation mode, the method further comprises:

adjusting, by the intelligent signal amplifier, a parameter of an operation window corresponding to the target time-domain operation mode.

14. The method according to claim 1, wherein the time-domain operation mode and the frequency-domain operation mode are allowed to be configured simultaneously and to be in an active state simultaneously.

15. The method according to claim 1, wherein the PHY signaling is a PDCCH order, the PDCCH order is used to define a target RNTI, and the target RNTI is used to activate or deactivate the operation mode configuration information.

16. The method according to claim 1, wherein the operation mode configuration information is at least used to configure an operation mode of a radio frequency unit for signal forwarding in the intelligent signal amplifier.

17. A non-transitory readable storage medium, wherein the non-transitory readable storage medium includes a program or instructions, and when the program or instructions are executed by a processor, the steps of the intelligent signal amplifier operation mode configuration method according to claim 1 are implemented.

18. An intelligent signal amplifier operation mode configuration method, wherein the method comprises:

sending, by a network-side device, operation mode configuration information to an intelligent signal amplifier; wherein the operation mode configuration information is used for configuring N operation modes for the intelligent signal amplifier; the N operation modes comprise at least one of the following: frequency-domain operation mode or time-domain operation mode; and a target operation mode is at least one of the N operation modes, wherein the method further comprises:

sending, by the network-side device, RRC signaling or PHY signaling to the intelligent signal amplifier, wherein the RRC signaling or PHY signaling is used to activate or deactivate the operation mode configuration information of the target operation mode.

19. A network-side device, comprising a processor, a memory, and a program or instructions stored in the memory and capable of running on the processor, wherein when the program or instructions are executed by the processor, the steps of the intelligent signal amplifier operation mode configuration method according to claim 18 are implemented.

20. An intelligent signal amplifier, comprising a processor, a memory, and a program or instructions stored in the memory and capable of running on the processor, wherein when the program or instructions are executed by the processor, following steps are implemented:

receiving operation mode configuration information from a network-side device;

setting, based on the operation mode configuration information, a target operation mode; and receiving RRC signaling or PHY signaling from the network-side device; wherein the operation mode configuration information is used for configuring N operation modes for the intelligent signal amplifier;

the N operation modes comprise at least one of the following: frequency-domain operation mode or time-domain operation mode; and the target operation mode is at least one of the N operation modes, wherein the RRC signaling or PHY signaling is used to activate or deactivate the operation mode configuration information of the target operation mode.

* * * * *